United States Patent [19]
Laas et al.

[11] 3,979,720
[45] Sept. 7, 1976

[54] APPARATUS FOR MONITORING A REDUNDANT MULTI-CHANNEL ANALOG SYSTEM

[75] Inventors: Daniel Laas, Erlangen; Herrmann Waldmann, Weiher, Landkreis Erlangen; Josef Wolf, Erlangen-Bruck, all of Germany

[73] Assignee: Siemens Aktiengesellschaft, Munich, Germany

[22] Filed: Apr. 30, 1975

[21] Appl. No.: 572,954

[30] Foreign Application Priority Data
May 22, 1974 Germany............................ 2424826

[52] U.S. Cl. ................. 340/146.1 BE; 235/153 AE; 307/219; 318/564; 328/117; 328/147; 328/154; 330/124 D
[51] Int. Cl.² ....................... G05B 1/02; G05B 23/02
[58] Field of Search............... 235/153 AE, 153 AH, 235/193; 307/204, 219, 235 R, 235 A, 235 G, 242; 328/116, 117, 147, 154, 163; 330/124 D; 340/146.1 BE, 147 B, 147 C, 147 CN, 147 SC; 318/564

[56] References Cited
UNITED STATES PATENTS

| 3,292,150 | 12/1966 | Wood | 235/193 X |
|---|---|---|---|
| 3,544,778 | 12/1970 | Masters | 340/146.1 BE |
| 3,596,107 | 7/1971 | Kittrell | 307/204 |
| 3,689,802 | 9/1972 | Waldmann | 340/146.1 BE |
| 3,740,652 | 6/1973 | Burgner | 307/235 G |
| 3,758,867 | 9/1973 | Schulz | 307/235 G |

Primary Examiner—R. Stephen Dildine, Jr.
Attorney, Agent, or Firm—Kenyon & Kenyon Reilly Carr & Chapin

[57] ABSTRACT

Apparatus for monitoring a redundant multi-channel analog system and for the forming of an undisturbed mean signal value in which all channels are connected to the inputs of a maximum value selection device and a minimum value selection device with a mean value former having as inputs the signals in all channels and the inverted extreme value signals detected by the two devices.

8 Claims, 3 Drawing Figures

APPARATUS FOR MONITORING A REDUNDANT MULTI-CHANNEL ANALOG SYSTEM

BACKGROUND OF THE INVENTION

The invention relates to apparatus for monitoring redundant multi-channel analog systems in general and more particularly to such apparatus for the forming of an undisturbed mean signal value.

In the transmission of analog signals in redundant multi-channel systems the signals of the individual channels are coupled to each other without interaction and are converted into an undisturbed signal for further transmission. The signals which deviate from the probably correct signal are to be detected and eliminated. This can be accomplished by comparing the signals of each channel with the signals in each other channel. The necessary number of comparisons, however, increases much faster than the number of channels. For three channels, three comparisons are required. For four channels, this doubles to six comparisons and, for only five channels, 10 comparisons are needed. In addition, the results of these comparisons must also be compared with each other and evaluated.

A selection circuit is known which eliminates the two extreme value signals of three input signals and provides the input signal with the value between the extreme value signals at its output (British Patent 918,106). However, this known evaluation circuit cannot be expanded to more than three channels. In addition, no mean value formation between several signals takes place.

SUMMARY OF THE INVENTION

It is an object of the present invention to create an apparatus of the kind mentioned at the outset in which the undisturbed output signal is mean value signal and in which an increase of the number of channels requires only a small number of additional electronic components.

According to the present invention, this is achieved with an apparatus having the following features:
a. all redundant channels are connected to the inputs of a maximum value selection device and to the inputs of a minimum value selection device, which supply respective detected extreme value signals at their outputs;
b. a mean value former has its input connected to all the redundant channels and to the outputs of the maximum value selection device and of the minimum value selection device and forms an undisturbed mean value signal by summing the signals in the redundant channels and the two inverted extreme value signals, and dividing by the number of channels, decreased by two.

In the apparatus of the present invention, the maximum value signal and the minimum value signal are first determined. These two extreme value signals are not to be considered when forming a mean value which is probably the correct value. This is accomplished not by eliminating the respective channels carrying the extreme signals, but by the provision that the two extreme value signals with inverted signs are used, in addition to the signals in all channels, as inputs to a mean value former. Thus, the two extreme value signals with their natural sign as well as with inverted signs are fed and to the mean value former are they therefore do not influence the result. In forming the mean value this inherent cancellation is taken into consideration by the using divisor which equals the number of monitored channels less two. For instance, in the case of four monitored channels, the mean value is obtained by division by two.

One embodiment of the invention includes indicators associated with both the maximum value selection device and the minimum value selection device to mark the channel carrying the respective extreme value signals. As also illustrated the undisturbed mean value signal can be compared with the two extreme value signals and the difference fed to further limit indicators for the generation of alarm signals. By means of these indicating devices a disturbance in one of the channels can be determined and the disturbed channel indicated.

DETAILED DESCRIPTION OF THE PREFERRED EMBODIMENT

Figure 1:
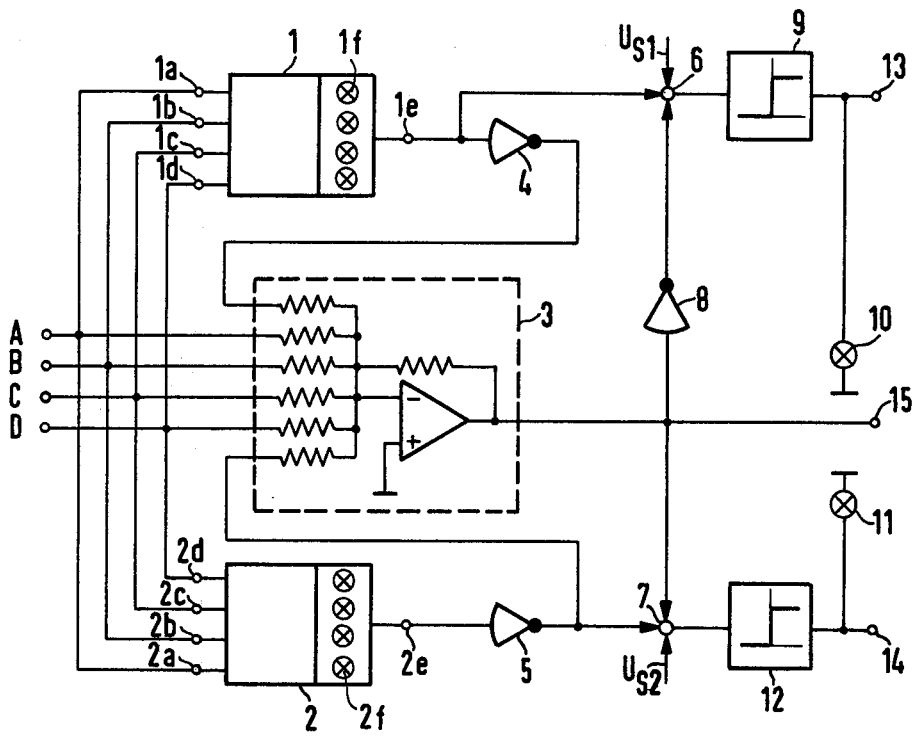
FIG. 1 is a block diagram of an apparatus according to the present invention.

The apparatus shown in FIG. 1 for monitoring a redundant multi-channel analog system with four channels A, B, C, and D. The individual channels are independent from each other in order to improve the reliability of the transmission function. The apparatus according to the present invention interlinks the channels without interaction to continuously monitor their functioning and to immediately indicate disturbances. The probably correct value is delivered at the output 15 as an undisturbed mean value.

In the apparatus according to the present invention, all the channels are connected to the inputs 1a to 1d of a maximum value selection device 1 and to the inputs 2a to 2d of a minimum value selection device 2. At the output 1e of the maximum value selection device 1, the maximum value signal among the signals in the channels A to D appears and at the output 2e of the minimum value selection device 2, the minimum signal appears. The channel which carries the respective extreme value signal is always indicated by associated light indicators 1f and 2f.

The probably correct signal is formed by a mean value former 3 having as inputs all four channels A to D along with the outputs 1e and 2e of inverting amplifiers 4 and 5 respectively, of the maximum value selection device 1 and the minimum value selection device 2. This means value former comprises, for instance, an operational amplifier with a negative feedback resistance and a number of input resistors, one for each input, of equal resistance value. The resistance of the feedback resistor in relation to the resistance of the input resistors, determines the divisor in conventional fashion.

In the example of FIG. 1, the channels A to D carry the voltages $U_A$ to $U_D$. Assume that the voltage $U_A$ in the channel A is the maximum value signal and the voltage $U_D$ in the channel D represents the minimum value signal. The input voltage $U_e$ of the operational amplifier in the mean value former 3 is then obtained as follows:

$$U_e = U_A + U_B + U_C + U_D - U_A - U_D \qquad (1)$$

It can be seen that in the formation of the sum the two extreme value signals are not taken into account. Equation (1) is simplified and becomes Equation (2):

$$U_e = U_B + U_C \qquad (2)$$

To form the mean value of the signals $U_B$ and $U_C$, it is necessary to divide by two. This is accomplished by using a feedback resistor whose resistance value is twice the resistance value of each of the input resistors. If the resistance value of each of the equal input resistors is designated $R$, the feedback resistor will have a resistance value $2R$. The mean value appears at the output 15 as the undisturbed signal.

The extreme value selection devices 1 and 2 are designed so that, even with undisturbed operation of all channels, extreme values are always determined and are excluded from the formation of the mean value. This results from the unavoidable minimal deviations of the signal levels of the individual channels and by the tolerances of the components used. To indicate a true disturbance in one of the monitored channels, the undisturbed mean value is compared, according to a further feature of the present invention, with the two extreme value signals. If the difference exceeds an adjustable threshold value, an alarm signal is triggered.

In the illustration of FIG. 1, the undisturbed mean value signal is inverted for this purpose in the inverting amplifier 8 and fed, together with the maximum value signal and a threshold voltage $U_{S1}$, to a summation point 6. An associated limit indicator 9, i.e. a comparator, generates an alarm signal at the output 13 and energizes a light emitting diode 10.

Similarly, the undisturbed mean value signal, the inverted minimum value signal and a threshold voltage $U_{S2}$ are fed to a summation point 7, coupled to a limit indicator 12 for generating a corresponding alarm signal at the output 14 and for energizing a light emitting diode 11.

The light emitting diodes 10 and 11 and the light indicators 1f and 2f of the maximum value selection device 1 and the minimum value selection device 2, permit the disturbed channels to be determined unequivocally.

Figure 2:
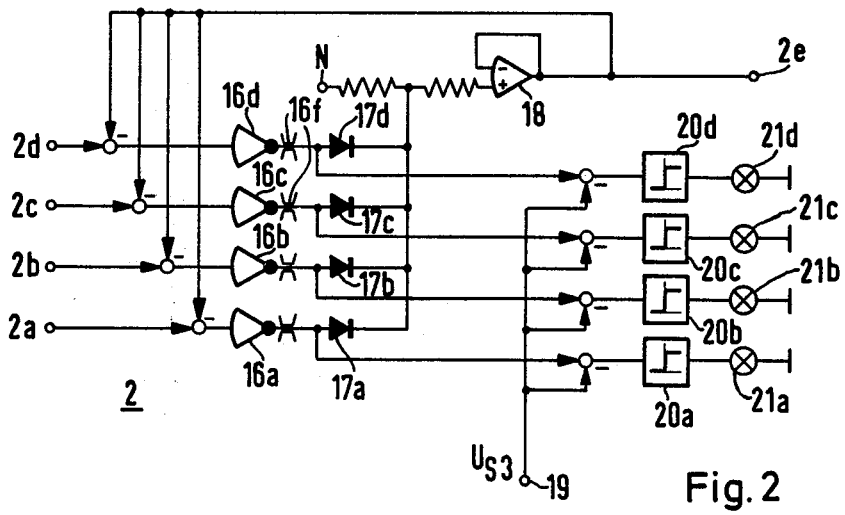
FIG. 2 is a schematic presentation of a minimum value selection device with indicating devices.

FIG. 2 shows, by way of example, the circuit of the minimum value selection device 2. It contains a diode circuit comprising four diodes 17a to 17d, coupled to the outputs of operational amplifiers 16a to 16d with limited output voltages, i.e. amplifiers 16a to 16d have associated diode limiters 16e. The cathodes of the diodes are connected to a common bus. The voltage present at the bus is compared to a negative comparison voltage N at the input of a decoupling amplifier 18, whose output 2e provides the minimum value signal. The latter is fed back to the inputs of the amplifiers 16a to 16d and compared there with the signals at the input terminals 2a to 2d. The amplifiers in those channels which do not carry the minimum value signal are driven into limitation in this circuit so that the diodes following them are cut off. Thus, only the diode in the channel which carries the minimum value signal conducts. The diode threshold values are reduced by the control loop described to a fraction which depends primarily on the no load gain of the operational amplifiers, and the diode characteristics are linearized. The diodes can therefore be considered as "ideal diodes". A minimum value signal is formed even upon the slightest deviations of the signals in the individual channels.

The maximum value selection device 1 operates according to the same principle. The diodes merely have opposite polarity with an appropriate comparison voltage chosen.

To indicate the channel carrying the minimum value signal, the output voltages of the four operational amplifiers 16a to 16d are compared with a respective bias $U_{S3}$ at the terminal 19 and the differences are fed to limit indicators 20a to 20d, which drive light indicators 21a to 21d. Light emitting diodes can advantageously be used as light indicators.

Figure 3:
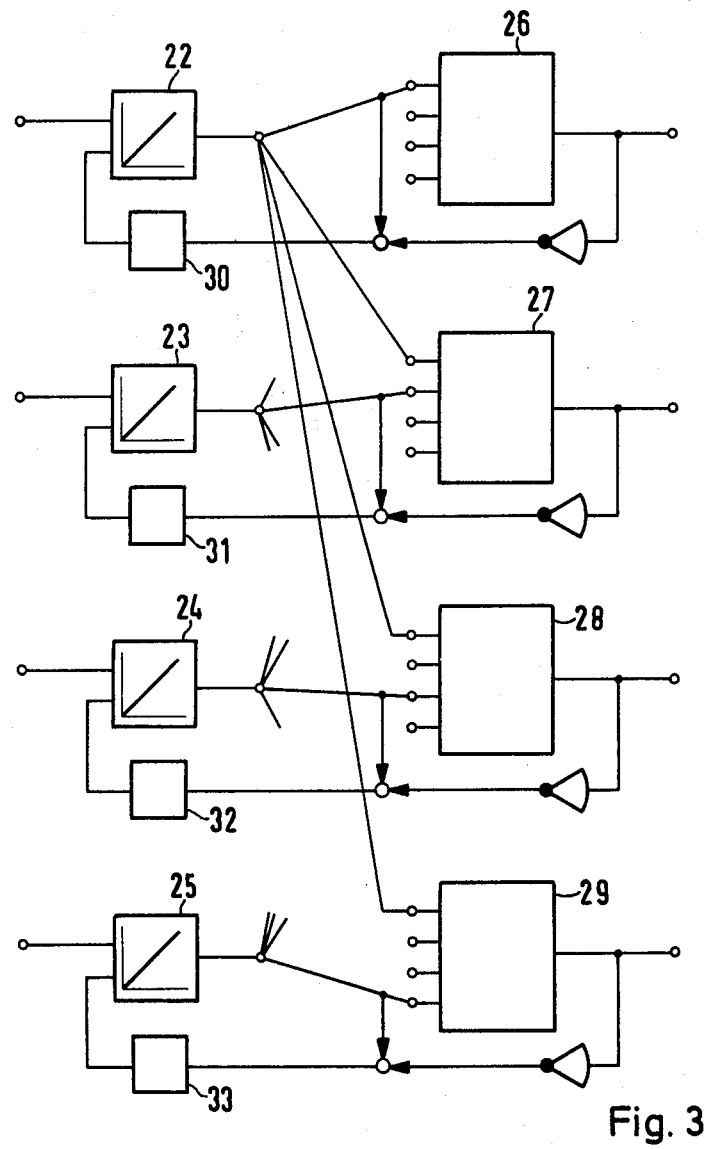
FIG. 3 is a schematic presentation of the application of apparatus according to the present invention to a redundant multi-channel system with integrating members.

FIG. 3 illustrates a particularly important example of an application of the invention. In this example transmission elements 22 to 25 with time integrating characteristics are provided in the individual channels. These integrating elements are servoed to the common mean value by compensation controllers 30 to 33. The difference between the undisturbed mean value signal formed by the respective device 26 to 29 and the output signal of the respective integrating member are fed to the compensation controllers as the control error. The compensating controllers may be designed as proportional controls with or without a dead zone or also may be designed as three level switching controls.

Thus, an improved apparatus for monitoring a redundant multi-channel analog system and for forming mean signal value without disturbances has been shown. Although specific embodiments have been illustrated and described, it will be obvious to those skilled in the art that various modifications may be made without departing from the spirit of the invention which is intended to be limited solely by the appended claims.

What is claimed is:

1. Apparatus for monitoring a redundant multi-channel analog system and for the forming of an undisturbed mean value signal comprising:
   a. a maximum value selection device having as inputs all redundant channels and providing an output corresponding to the input channel having the maximum value;
   b. a minimum value selection device having as inputs all redundant channels and providing output corresponding to the channel having the minimum value;
   c. first and second means for respectively inverting the outputs of said minimum value selection device and said maximum value selection device;
   d. a mean value former having as inputs all of said redundant channels and the outputs of said first and second means, said mean value former including means to add all of said input signals and to divide the result by a number which is two less than the number of redundant channels.

2. Apparatus according to claim 1 wherein each of said maximum value selection device and minimum value selection device further include means for indicating the channel carrying an extreme value.

3. Apparatus according to claim 2 and further including means for comparing the undisturbed mean value signal output of said mean value former with the maximum value signal from said maximum value selection device and for generating an alarm signal if the difference therebetween exceeds a predetermined amount.

4. Apparatus according to claim 3 and further including means for comparing the undisturbed mean value signal output of said mean value former with the minimum value signal from said minimum value selection device and for generating an alarm signal if the difference therebetween exceeds a predetermined amount.

5. Apparatus according to claim 2 and further including means for comparing the undisturbed mean value signal output of said mean value former with the minimum value signal from said minimum value selection device and for generating an alarm signal if the difference therebetween exceeds a predetermined amount.

6. Apparatus according to claim 1 and further including means for comparing the undisturbed mean value signal output of said mean value former with the minimum value signal from said minimum value selection device and for generating an alarm signal if the difference therebetween exceeds a predetermined amount.

7. Apparatus according to claim 1 and further including means for comparing the undisturbed mean value signal output of said mean value former with the maximum value signal from said maximum value selection device and for generating an alarm signal if the difference therebetween exceeds a predetermined amount.

8. Apparatus according to claim 1 wherein said multi-channel system includes integrating members in the individual channels and wherein a compensating controller is provided for each integrating member having as inputs the difference between the undisturbed mean value signal and the output signal of a respective integrating member.

* * * * *